United States Patent
Baiyor et al.

(10) Patent No.: US 6,445,915 B1
(45) Date of Patent: *Sep. 3, 2002

(54) APPARATUS, METHOD AND SYSTEM FOR PROVIDING VARIABLE TERMINATION PATTERNS FOR MULTIPLE TELECOMMUNICATION SESSIONS

(75) Inventors: Robert John Baiyor; Deborah Thomas Earl, both of Naperville; Harold Robert Smith, Jr., Oakbrook Terrace; Thomas Dale Strom, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/350,439

(22) Filed: Jul. 9, 1999

(51) Int. Cl.[7] ............................................... H04M 3/42
(52) U.S. Cl. ..................... 455/416; 455/417; 455/445; 455/519; 379/202; 379/211.01
(58) Field of Search ................................ 455/433, 416, 455/445, 417, 519; 379/202, 211.01, 211.02, 211.03, 211.04

(56) References Cited

U.S. PATENT DOCUMENTS

| | | | | |
|---|---|---|---|---|
| 5,711,002 A | * | 1/1998 | Foti | 455/433 |
| 5,889,844 A | * | 3/1999 | Kim et al. | 379/202 |
| 6,005,930 A | * | 12/1999 | Baiyor et al. | 379/202 |
| 6,141,556 A | * | 10/2000 | Dougherty et al. | 455/416 |

* cited by examiner

*Primary Examiner*—Lee Nguyen
(74) *Attorney, Agent, or Firm*—Nancy R. Gamburd

(57) ABSTRACT

An apparatus, method and system are disclosed for providing variable termination and alerting patterns, based upon call progress information, for multiple leg telecommunication sessions, such as for flexible alerting. The preferred wireless system embodiment includes a home location register (HLR) and a mobile switching center (MSC). The HLR stores a plurality of secondary directory numbers(with corresponding routing parameters) associated with a pilot directory number. The MSC differentially processes and routes each outgoing call leg associated with each secondary directory number, to form a plurality of outgoing call legs. As the various outgoing call legs may be answered, not answered, released, have routing failures, or return busy signals, the MSC generates, and transmits to the HLR, corresponding call progress and status information. Based upon such information, the HLR may dynamically vary the termination and alerting patterns for outgoing call legs corresponding to the secondary directory numbers. When the call progress and status information indicates a misrouting of an outgoing call leg of the plurality of outgoing call legs, the HLR has instructions to delete a secondary directory number corresponding to the misrouted outgoing call leg from the first plurality of secondary directory numbers, which will create a different termination pattern for the next session. The HLR also includes instructions, when the call progress and status information indicates a variance from subscriber parameters, to adjust a termination and alerting pattern corresponding to the first plurality of secondary directory numbers, such as increasing or decreasing routing parameters, including timing delay parameters and no answer time parameters.

40 Claims, 7 Drawing Sheets

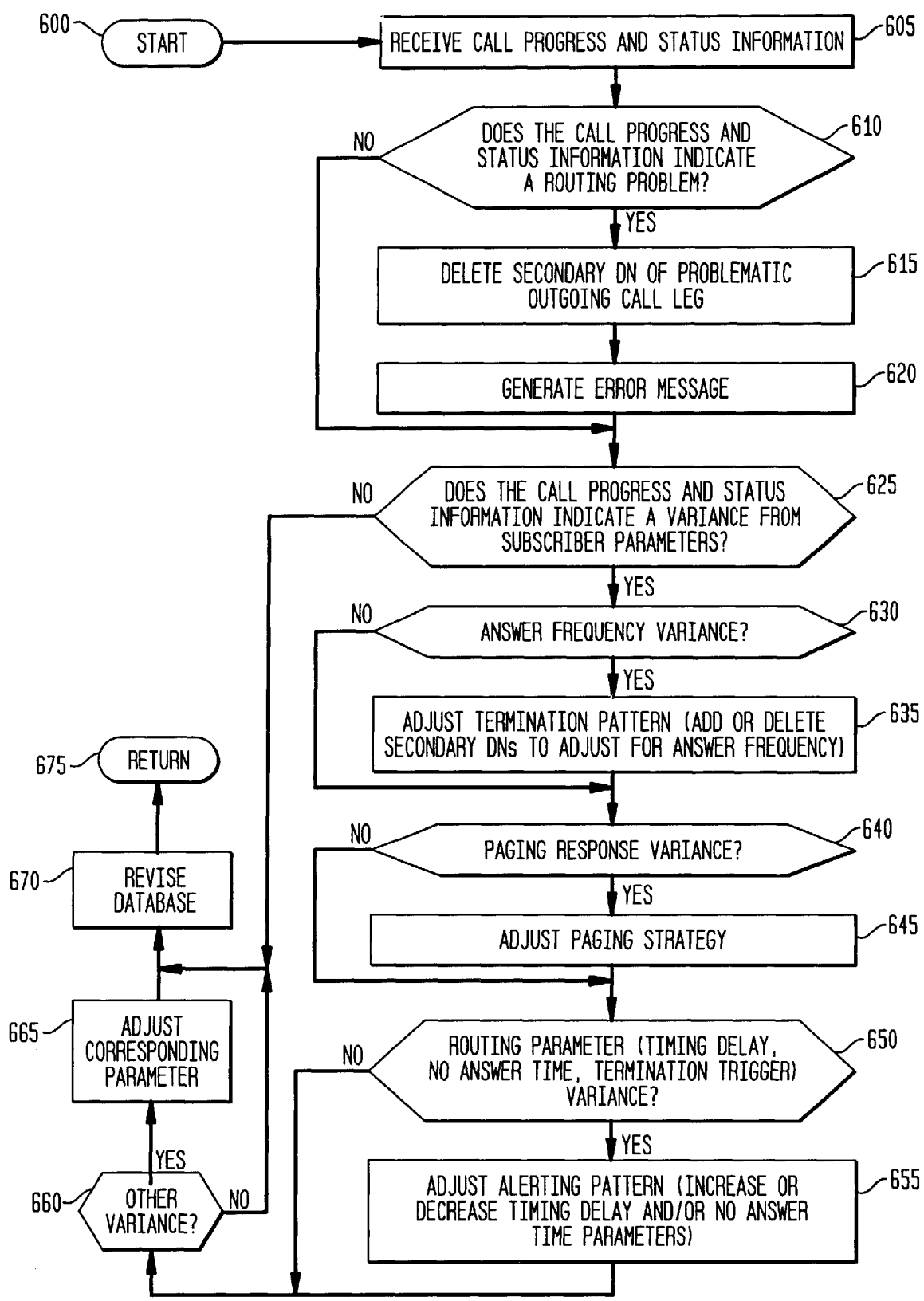

APPARATUS, METHOD AND SYSTEM FOR PROVIDING VARIABLE TERMINATION PATTERNS FOR MULTIPLE TELECOMMUNICATION SESSIONS

CROSS-REFERENCE TO RELATED APPLICATIONS

This application is related to Baiyor et al., U.S. patent application Ser. No. 09/094,837, entitled "Apparatus, Method And System For Controlling The Start Of Alerting Of Multiple Leg Telecommunication Sessions", filed Jun. 15, 1998, commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, entitled "Apparatus, Method And System For Controlling Secondary Treatment By a Distant Switch Of Multiple Leg Telecommunication Sessions", filed Jun. 15, 1998, commonly assigned to Lucent Technologies, Inc., and incorporated by reference herein, with priority claimed for all commonly disclosed subject matter (the "second related application").

This application is related to Baiyor et al., U.S. patent application Ser. No. 09/097,527, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

This application is related to Baiyor et al., U.S. patent application Ser. No. 09/342,499, entitled "Apparatus, Method And System For Providing Variable Alerting Patterns For Multiple Leg Telecommunication Sessions", filed Jun. 29, 1999, commonly assigned to Lucent Technologies, Inc., and incorporated by reference herein, with priority claimed for all commonly disclosed subject matter (the "fourth related application").

This application is related to Baiyor et al., U.S. patent application Ser. No. 09/350,577, entitled "Apparatus, Method And System For Providing Call Progress Information For Multiple Leg Telecommunication Sessions For Intelligent Network Services", filed concurrently herewith, commonly assigned to Lucent Technologies, Inc., and incorporated by reference herein, with priority claimed for all commonly disclosed subject matter (the "fifth related application").

FIELD OF THE INVENTION

The present invention relates in general to telecommunication systems, and more particularly, to an apparatus, method and system for providing variable termination patterns for multiple leg telecommunication sessions for intelligent network services.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". The ANSI-41 flexible alerting specification, however, does not include any specific directions or guidelines for implementation and control of such independent outgoing multiple leg calls.

As disclosed in the fifth related application, the ANSI-41 flexible alerting specification also does not include the provision of call progress and status information to, for example, provide intelligent network services, such as variable termination patterns for flexible alerting. Other prior art systems which utilize call progress information for various purposes are generally not automatic and do not provide variable alerting patterns; rather information from sources such as billing records may be collected and analyzed by an individual person, who at a later date then manually enters system changes on the basis of his or her analysis. In addition, such provision of call progress information is not in real time, is static until manually changed again, and is not automatically and immediately updated on a dynamic basis.

As a consequence, a need remains for an apparatus, method and system to provide variable termination lists or patterns, based upon call progress and status information, for multiple leg telecommunication sessions, such as for flexible alerting calls. Such an apparatus, method and system should utilize such call progress and status information, to create variable termination and alerting patterns, automatically and without user intervention, should be user friendly, and should be user transparent. Such provision of variable termination and alerting patterns should also be provided in real time and on a dynamic basis, to be responsive to changing environmental and user conditions which may arise in wireless or wireline communication systems.

SUMMARY OF THE INVENTION

In accordance with the present invention, a method, apparatus and system are disclosed which provide variable termination and alerting patterns, based upon call progress and status information, for multiple leg telecommunication sessions, such as for flexible alerting services. Such variable termination and alerting patterns are provided dynamically and in real time, to be responsive to changing environmental and user conditions.

For example, call progress and status information may indicate that an outgoing call leg has been misrouted or improperly routed, such as to an erroneously encoded secondary directory number. As a consequence, in accordance with the present invention, that secondary directory number is deleted from the flexible alerting group, and an error message is generated to correct the problem. For subsequent communication sessions, network resources are not wasted by attempting to route an outgoing call leg to a problematic secondary directory number.

Also for example, call progress and status information may indicate that a particular mobile telephone answers and receives many more flexible alerting calls than other members of the flexible alerting group. As a consequence, in accordance with the present invention, the secondary directory number for that mobile telephone may be temporarily deleted from the flexible alerting group, so that an outgoing call leg is not routed to that mobile telephone, allowing other members of the group to answer flexible alerting calls.

Under other circumstances, also to allow other members of the group to answer flexible alerting calls, the alerting patterns may be varied, to alert these other members earlier and for a longer period of time.

One of the system embodiments includes a switching center, such as a mobile switching center, and a database, such as a home location register. In addition to receiving an incoming call leg designating a primary or pilot directory number, and routing the outgoing call legs to the various secondary directory numbers, the switching center generates and transmits (to the database) call progress and status information for the plurality of outgoing call legs corresponding to a first plurality of secondary directory numbers associated with a primary directory number. The database has stored in a memory the first plurality of secondary directory numbers and corresponding routing parameters. When the database receives call progress and status information, depending upon the information, the database may alter the termination and alerting patterns for the particular flexible alerting group. The database includes instructions, when the call progress and status information indicates a misrouting of an outgoing call leg of the plurality of outgoing call legs, to delete a secondary directory number corresponding to the misrouted outgoing call leg from the first plurality of secondary directory numbers. In addition, the database includes further instructions, when the call progress and status information indicates a variance from subscriber parameters, such as the answering frequency mentioned above, to adjust a termination and alerting pattern corresponding to the first plurality of secondary directory numbers. For example, timing delay and no answer time parameters may be adjusted to create a varied alerting pattern, or the particular secondary directory numbers utilized for a given session may be varied, to create a different termination pattern.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 6 is a flow diagram illustrating a method embodiment to generate variable termination patterns in accordance with the present invention.

DETAILED DESCRIPTION OF THE INVENTION

Figure 1A:
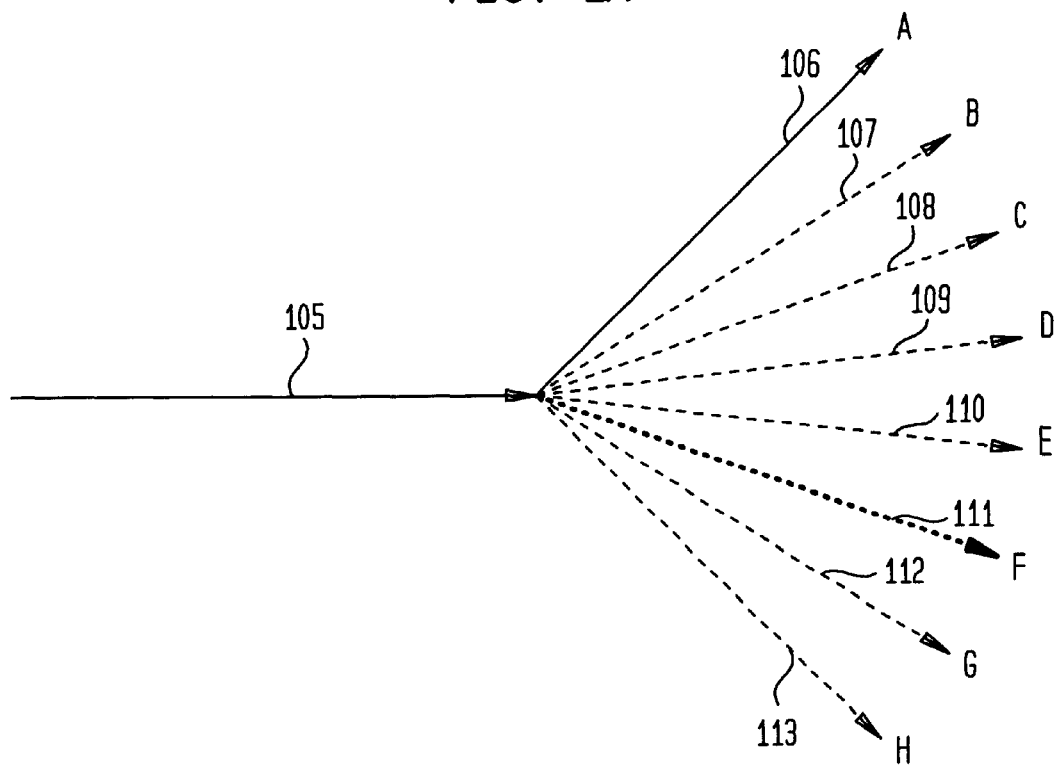
FIG. 1A is a graphical diagram illustrating a first scheme for alerting of multiple outgoing communication sessions, utilized in generating call progress information in accordance with the invention of the fifth related application.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

In accordance. with the present invention, an apparatus, method and system are illustrated which provide variable termination and alerting patterns, based on call progress and status information, for multiple leg telecommunication sessions, such as varying the current members of flexible alerting group or varying how such members are alerted. The apparatus, method and system of the present invention provide such variable termination patterns automatically and without user intervention, are user friendly and user transparent. In addition, such variable termination patterns, based upon call progress information, are provided in real time and on a dynamic basis, to be responsive to changing environmental and user conditions which may arise in wireless or wireline communication systems.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary directory numbers are alerted. Such a list or grouping may be referred to as a flexible alerting group, or more broadly as an alerting group or a secondary DN group, (and may also be referred to as a termination group or list when incorporated in certain response messages discussed below). In addition, each secondary DN of the group may also be referred to as a member of the group, and in accordance with the present invention, that membership may be varied dynamically.

An incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

FIG. 1A is a graphical diagram illustrating such a flexible alerting scheme for alerting of multiple outgoing communication sessions, utilized in generating call progress information in accordance with the invention disclosed in the fifth related application. As illustrated in FIG. 1A, an incoming call leg 105, designating a pilot DN (or other primary DN), is processed by a switch to generate multiple outgoing call legs to a flexible alerting group of secondary DNs A–H: outgoing call leg 106 to secondary DN "A"; outgoing call leg 107 to secondary DN "B"; outgoing call leg 108 to secondary DN "C"; outgoing call leg 109 to secondary DN "D"; outgoing call leg 110 to secondary DN "E"; outgoing call leg 111 to secondary DN "F"; outgoing call leg 112 to secondary DN "G"; and outgoing call leg 113 to secondary DN "H".

Continuing to refer to FIG. 1A, outgoing call leg 106 to secondary DN "A" has been illustrated as a first to answer call leg, which in accordance with ANSI-41, is then connected to incoming call leg 105 to create a communication session (illustrated as communication session 115 in FIGS. 1B and 1C), and the remaining outgoing call legs B–H are released. As illustrated in FIG. 1A, however, outgoing call leg 111 is problematic, such that no outgoing call leg was actually received by secondary DN "F". For example, the secondary DN "F" may have been improperly encoded in the switch, resulting in a routing failure, with the outgoing call leg being transmitted to a non-existent DN. Also for example, an outgoing call leg may have been processed for transmission to a mobile telephone which has not responded to a page ("no page response"), and no outgoing call leg is actually generated. As discussed in greater detail below, this information and other, related information is provided, in real time, for utilization on a dynamic basis to vary termination patterns, for example, to avoid such routing failures in the future or to avoid transmitting another call to a secondary DN which is occupied with a current call. Such information is referred to herein as call progress and status information, and in the interests of brevity, may be referred to herein simply as call progress information.

The ANSI-41 specification, however, does not address the provision or utilization of such call progress information for dynamic control of these multiple outgoing calls, such as for providing variable termination patterns. Rather, the ANSI-41 specification merely addresses and requires that an incoming call to a pilot DN be routed to the associated, secondary DNs of the flexible alerting group, with the calling party ultimately connected to the answering party. An exemplary lack of such provision and utilization of such call progress information, and potential resulting inefficiencies, are illustrated with respect to FIG. 1B.

Figure 1B:
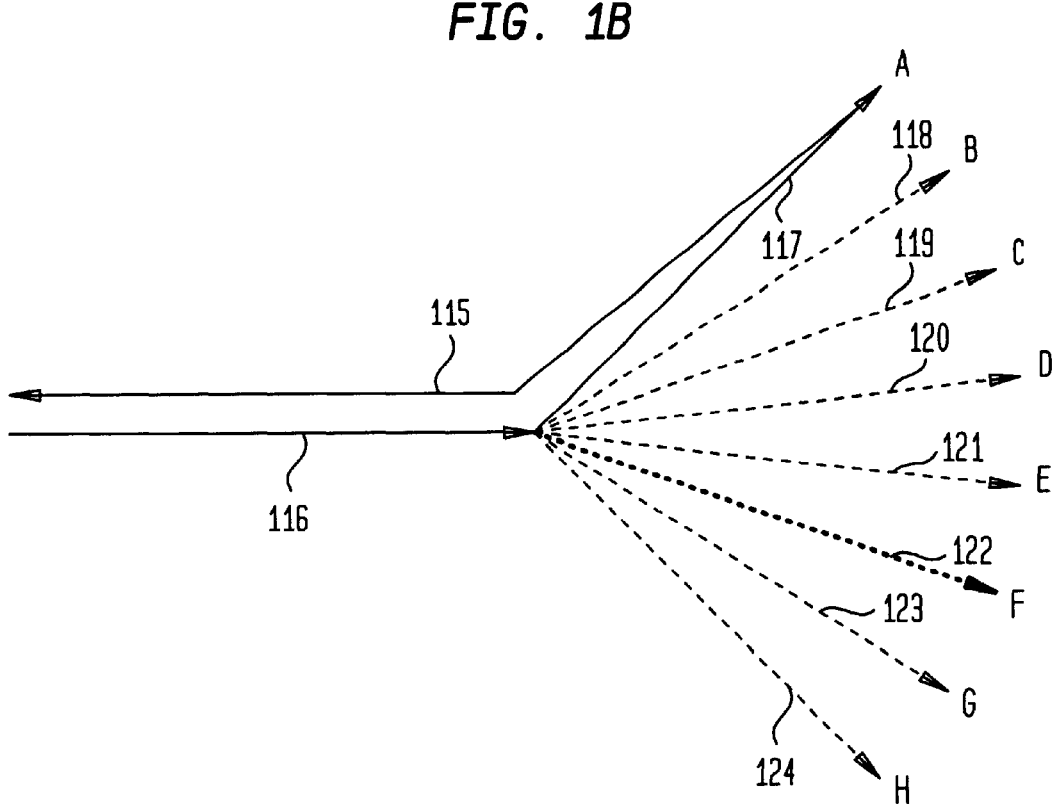
FIG. 1B is a graphical diagram illustrating a second scheme for alerting of multiple outgoing communication sessions, subsequent to the alerting illustrated in FIG. 1A, without the utilization of call progress information in accordance with the present invention.

FIG. 1B is a graphical diagram illustrating a second scheme for alerting of multiple outgoing communication sessions, subsequent to the alerting illustrated in FIG. 1A, without the utilization of call progress information to vary the termination patterns of the present invention. As illustrated in FIG. 1B, due to the previous incoming call leg 105, a communication session 115 has already been established with the called party of secondary DN "A". Following the establishment of the communication session 115, a second incoming call leg 116 designating the same pilot DN (or other primary DN), is processed by the switch, without the call progress information of the present invention, to generate the same multiple outgoing call legs to the same flexible alerting group of secondary DNs A–H: outgoing call leg 117 to secondary DN "A"; outgoing call leg 118 to secondary DN "B"; outgoing call leg 119 to secondary DN "C"; outgoing call leg 120 to secondary DN "D"; outgoing call leg 121 to secondary DN "E"; outgoing call leg 122 to secondary DN "F"; outgoing call leg 123 to secondary DN "G"; and outgoing call leg 124 to secondary DN "H".

Without utilization of call progress information to vary the termination pattern in accordance with the present invention, FIG. 1B illustrates several potential problems that may arise under the ANSI-41 specification. First, as illustrated in FIG. 1B, secondary DN "A", while engaged with communication session 115, receives and answers a second call, outgoing call leg 117, such as through call waiting. This reception of such a second call may result in an inefficient use of resources, as the party of secondary DN "A" may already be fully occupied with the previous communication session 115 and may be, for example, involved in helping a customer and should not be interrupted; a second customer on incoming call leg 116 may be better served by another member of the flexible alerting group (another secondary DN), who is not already occupied with a customer on another call. In addition, network resources have also been used inefficiently in FIG. 1B, as another outgoing call leg 122 has been generated but has not been received by the intended secondary DN "F".

As may be apparent from the discussion above, in accordance with the present invention, the immediate and dynamic utilization of call progress information, generated from previous flexible alerting sessions, may be highly valuable and produce significant network and user efficiencies. An exemplary scheme for utilization of call progress information, to provide a variable termination pattern in accordance with the present invention, is illustrated in FIG. 1C.

Figure 1C:
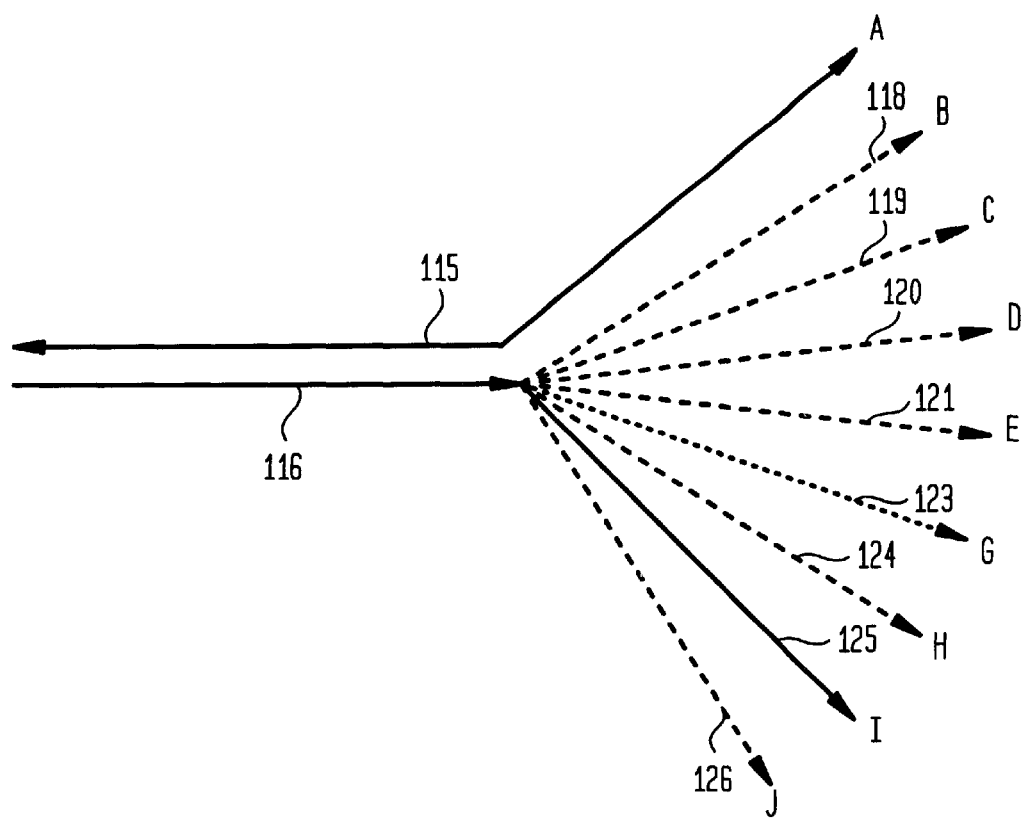
FIG. 1C is a graphical diagram illustrating a third scheme for alerting of multiple outgoing communication sessions, subsequent to the alerting illustrated in FIG. 1A, with the utilization of call progress information to provide a varied termination pattern in accordance with the present invention.

FIG. 1C is a graphical diagram illustrating an exemplary, varied termination pattern for alerting of multiple outgoing communication sessions, with the utilization of call progress information provided following the alerting illustrated in FIG. 1A, in accordance with the present invention. Based upon FIG. 1A, such call progress information preferably includes information that the secondary DN "A" is currently engaged with another communication session 115, and that secondary DN "F" did not receive an outgoing call leg 111 because, for example, of a routing failure due to an erroneous encoding of the secondary DN in the original establishment of the flexible alerting group. As a consequence, based upon this call progress information, the outgoing call legs may be routed differently, and in accordance with the present invention, the flexible alerting group may be varied on a dynamic basis, and in real time.

More particularly, utilizing this call progress information, for subsequent communication sessions, outgoing call legs will not be routed to secondary DN "A" for a reasonable period of time (approximately a sufficient period of time for that party to finish the previous communication session), and outgoing call legs will not be routed to secondary DN "F" (until the routing failure has been corrected). As a consequence, the termination pattern of routing outgoing call legs to secondary DNs "A" through "H" has been altered, temporarily deleting secondary DN "A" and secondary DN "F" from the alerting group (via a termination list, as discussed in greater detail below).

Second, and separate from the removal of secondary DNs discussed above, depending upon subscriber goals and preferences, additional secondary DNs may be added into the alerting group. For example, the subscriber may establish a flexible alerting group of 12 secondary DNs, of which only 8 are to receive outgoing call legs at any given time, with 4 secondary DNs being maintained as "extras". As various secondary DNs may then become involved in communication sessions or not respond to pages and thereby be temporarily removed from the alerting group, as additional incoming call legs are received, these extra secondary DNs may then be included in the termination list. These additional secondary DNs may then receive outgoing call legs, and the size of the alerting group actually receiving calls is maintained constant (at 8, in this example). These two separate uses of the call progress information, deleting secondary DNs from the alerting group, and adding other secondary DNs to the alerting group, are illustrated in FIG. 1C.

As illustrated in FIG. 1C, due to the previous incoming call leg 105, a communication session 115 also has already been established with the called party of secondary DN "A". Following the establishment of the communication session 115, a second incoming call leg 116 also designating the same pilot DN (or other primary DN), is processed by the switch, with the call progress information discussed above, to generate multiple outgoing call legs to a varied flexible alerting group of secondary DNs, which differs from the alerting group of FIG. 1A. More specifically, outgoing call legs to secondary DN "A" and secondary DN "F" are not generated, while other outgoing call legs are generated as follows: (same) outgoing call leg 118 to secondary DN "B"; (same) (same) outgoing call leg 119 to secondary DN "C"; (same) outgoing call leg 120 to secondary DN "D"; (same) outgoing call leg 121 to secondary DN "E"; (same) outgoing call leg 123 to secondary DN "G"; (same) outgoing call leg 124 to secondary DN "H"; (new) outgoing call leg 125 to secondary DN "I", illustrated as an answering call leg; and (new) outgoing call leg 126 to secondary DN "J".

As illustrated in FIG. 1C, the original termination pattern (of FIG. 1A) has been dynamically varied, for the subsequent flexible alerting session: secondary DNs "A" and "F" have been excluded or removed from the flexible alerting group, while secondary DNs "I" and "J" have been included in the flexible alerting group, while all of these secondary DNs are associated with the same primary or pilot DN. As a consequence, the party of secondary DN "A" engaged in communication session 115 is not interrupted, and network resources are not wasted by erroneously sending an outgoing call leg to secondary DN "F". Instead, based upon the call progress and status information, the termination pattern has been varied in accordance with the present invention, transmitting additional call legs to new or additional parties, secondary DNs "I" and "J", effectively dynamically redefining and varying the flexible alerting group in real time.

As call progress information continues to be generated and accumulated during and following each flexible alerting session, the termination patterns may continue to be varied, again and again, as needed to accomplish the objectives of the particular flexible alerting group. Not only may membership of the group (the termination list of secondary DNs) be varied dynamically as needed, but also the specific alerting pattern for the outgoing call legs may be varied, for any given set of secondary DNs, as discussed in greater detail below.

As disclosed in the fourth related application, the alerting patterns for a flexible alerting group may also be varied, for example, creating patterns such as concurrent alerting, sequential alerting, cascade alerting, and pyramid alerting. As disclosed, these patterns are created by changing, in various combinations, on a per outgoing call leg basis, parameters referred to as a timing delay parameter, a no answer time parameter, and a no answer termination trigger parameter.

Figure 1D:
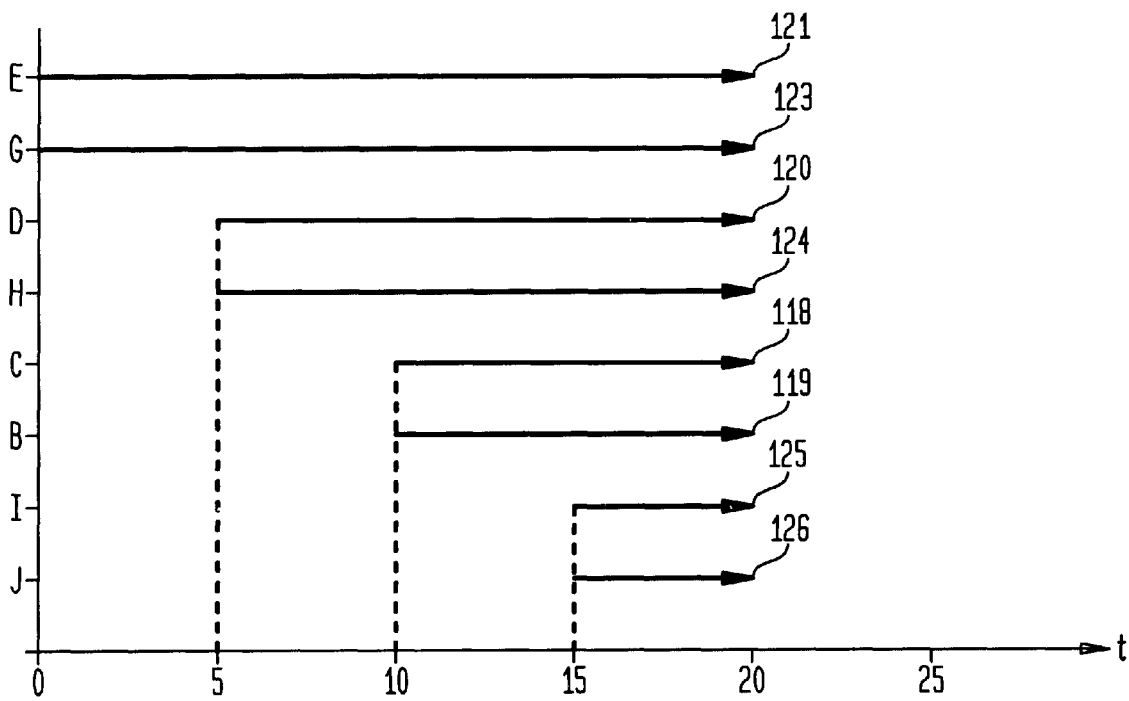
FIG. 1D is a graphical diagram illustrating an exemplary pyramid alerting scheme for multiple outgoing communication sessions, varied based upon call frequency information, to provide a varied termination pattern in accordance with the present invention.

FIG. 1D is a graphical diagram illustrating an exemplary pyramid alerting scheme for multiple outgoing communication sessions, varied based upon call frequency information, to provide a varied termination pattern in accordance with the present invention. As discussed in greater detail below and in the fifth related application, call progress information may include parameters such as identification of the answering call leg, answering reason, and time to answer. As this information is accumulated, call answering frequency information may be generated for each secondary DN of a flexible alerting group. This call frequency information may ascertain, for example, that certain secondary DNs of a flexible alerting group answer comparatively more flexible alerting calls than other secondary DNs. Depending upon the objectives of a flexible alerting group, such as for a repair service, it may be preferable that all secondary DNs answer an approximately equal number of calls, resulting in an approximately equal call answering frequency.

Referring to FIG. 1D, to achieve such an approximately equal call answering frequency, a pyramid alerting scheme may be implemented. For example, it may be determined that secondary DNs "E" and "G" have a comparatively lower answering frequency because they take a comparatively longer time to answer their outgoing call legs. As a consequence, they should be given a comparatively longer time to answer, as illustrated in FIG. 1D, with a pyramid alerting scheme.

As illustrated in FIG. 1D, alerting of outgoing call legs 121 and 123, for secondary DNs "E" and "G", commence immediately at a time t=0, having timing delay parameters equal to zero seconds, while alerting of the remaining call legs is delayed for varying periods of time (utilizing correspondingly varied timing delay parameters greater than zero seconds). Utilizing no answer time parameters (equal to 20 seconds, as illustrated), alerting of outgoing call legs 121 and 123 will continue for 20 seconds, unless another call leg has been answered previously. Next, after a 5 second timing delay, outgoing call legs 120 and 124 are alerted, to secondary DNs "D" and "H", respectively, which may have the next lowest answering frequencies. Similarly, after an additional 5 second timing delay (10 seconds total), outgoing call legs 118 and 119 are alerted, to secondary DNs "C" and "B", respectively, which may have comparatively greater answering frequencies. Lastly, after an additional 5 second timing delay (15 seconds total), outgoing call legs 125 and 126 are alerted, to secondary DNs "I" and "J", respectively, which may have the comparatively greatest answering frequencies.

Not separately illustrated, other alerting schemes may be implemented based upon call progress information, in addition to the pyramid alerting scheme illustrated in FIG. 1D. For example, depending upon the objectives of any given flexible alerting group, a sequential alerting scheme may be implemented, in which a subsequent call leg is alerted only when a previously alerted call leg has not been answered (or its no answer time parameter has elapsed). Other alerting schemes, as disclosed in detail in the fourth related application, such as cascade or concurrent alerting, may also be implemented.

Figure 2:
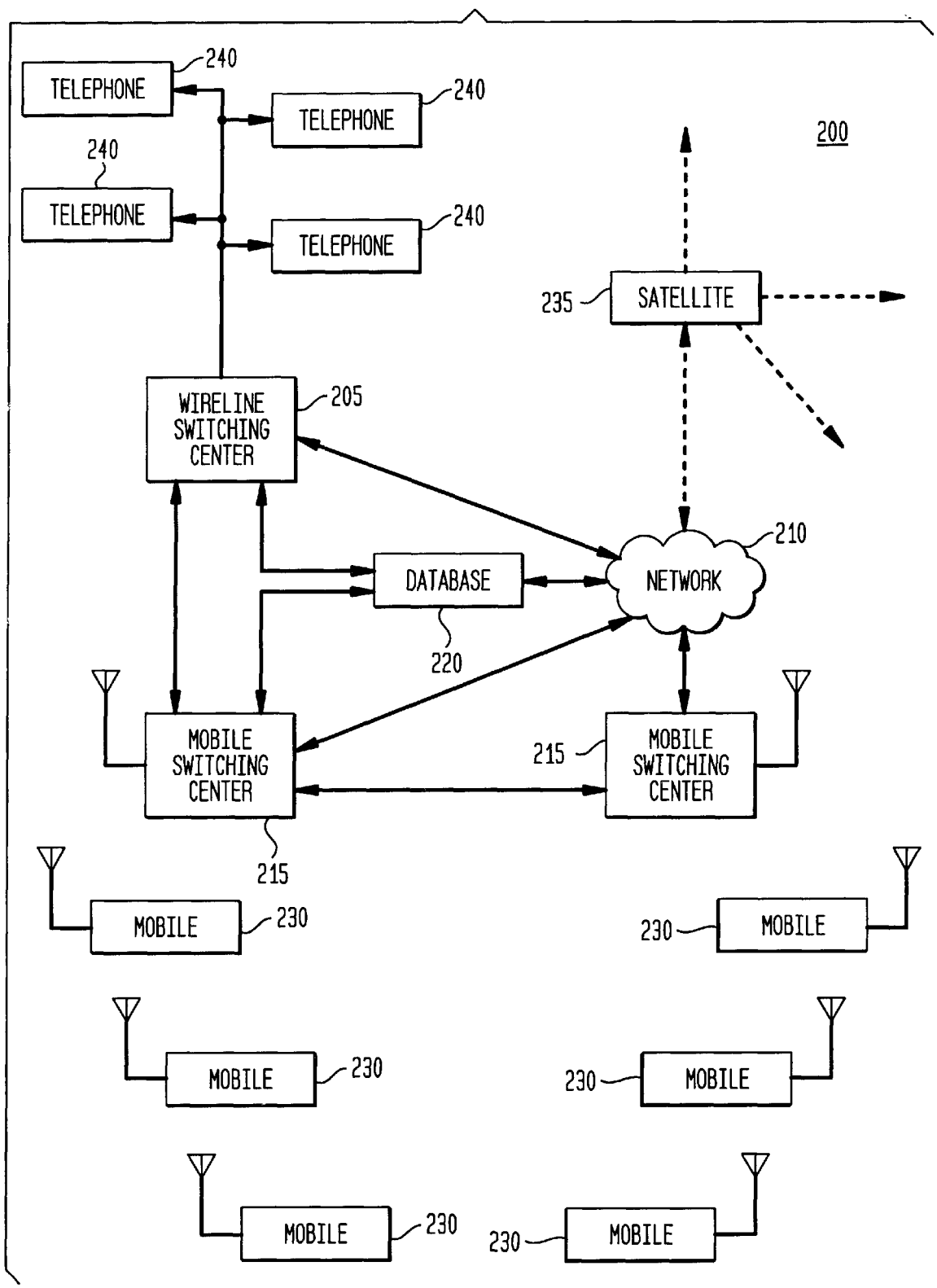
FIG. 2 is a block diagram illustrating a first system embodiment in accordance with the present invention.

FIG. 2 is a block diagram illustrating a first system embodiment 200 in accordance with the present invention.

The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The wireline switching center 205 is also generally connected to a plurality of telephones 240 or other customer premise equipment, while the MSCs 215 (via base stations or other wireless transceivers, not separately illustrated) typically have a wireless link to the various mobile units 230, such as cellular telephones within a particular geographic region. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 2, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). In accordance with the related inventions, the database 220 transmits a response to the corresponding switching center 205 or 215, containing or listing the associated DNs and each of their corresponding parameters (one set of parameters for each associated DN), such as each of their timing delay parameters (ring start adjustment time ("RSAT") values), no answer time parameters (NAT values), and no answer termination trigger parameters. Utilizing these corresponding parameters, the switching center 205 or 215 begins the processing and routing of the associated outgoing call legs, with such processing and routing of each outgoing call leg delayed according to its corresponding timing delay parameter, and unless one of the call legs is answered, with each such outgoing call leg allowed to be alerted according to its no answer time parameter, followed by release according to its no answer termination trigger parameter.

In accordance with the invention disclosed in the fifth related application, during and following such a flexible alerting session, the switch, such as the mobile switching center 215 or wireline switching center 205 generates and transmits call progress information to the database 220. As discussed above, such call progress information may include, for example, identification of the answering call leg, such as outgoing call leg 106 to secondary DN "A", and information concerning routing failures, such as outgoing call leg 111 to secondary DN "F". In addition, as discussed in greater detail below, other call progress information may include parameters such as the elapsed time for an outgoing call leg to be answered, or information related to various aspects of routing, such as a page response, a no page response, a busy reason, a no answer reason, an answer reason, or a routing failure as mentioned previously.

In accordance with the present invention, the database 220 compiles and dynamically utilizes this call progress information received from the various switches 205 or 215. For subsequent flexible alerting sessions, for example, as mentioned above, the database 220 may vary the listing of secondary DNs (associated with the primary DN) transmitted to the switches for processing and routing, or may vary the parameters associated with secondary DNs (such as the timing delay parameters), to result in variable termination and alerting patterns, as discussed above.

Figure 3:
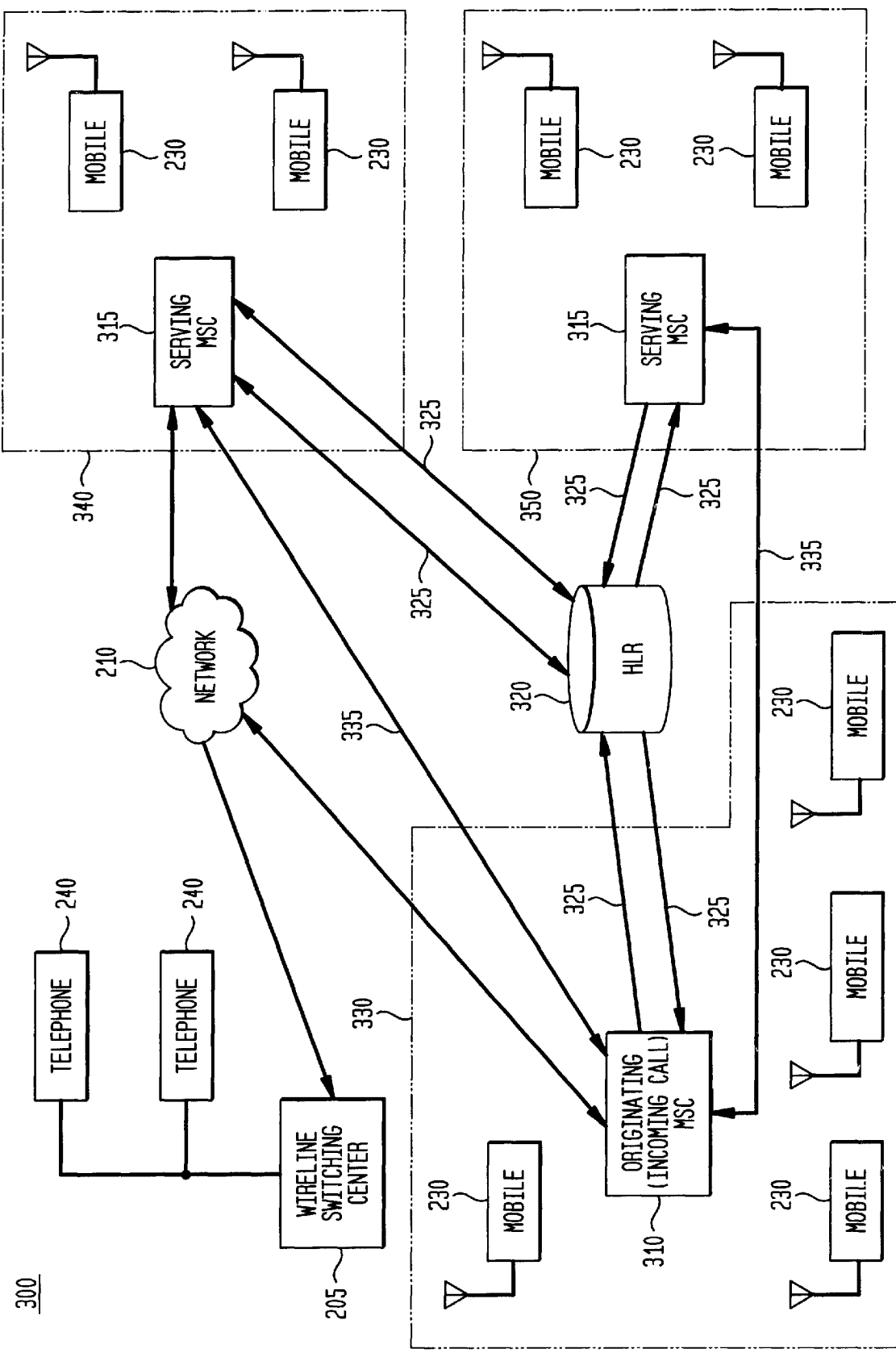
FIG. 3 is a block diagram illustrating a second system embodiment for wireless communication in accordance with the present invention.

FIG. 3 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an incoming call or originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A stand-alone home location register ("HLR") 320 is utilized in this preferred embodiment, among other things, to implement the database 220 and other ANSI-41 signaling functionality. The various 20 MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections.

As indicated above, a user or subscriber typically defines their alerting group of secondary telephone numbers (or other directory numbers). These secondary DNs are those numbers that the subscriber would like alerted when their pilot or other primary DN is called. In accordance with the present invention, based upon call progress and status information, such alerting groups or termination lists may be dynamically varied, in real time. Such secondary DNs included in a user defined alerting group or termination list may also be divided into different groupings or sets based upon their potentially differing routing requirements. For example, the wireless and wireline groupings may be utilized, along with subsets of these groupings, such as wireless DNs served by MSCs other than the originating MSC 310. In accordance with the invention disclosed in the first related application, four types of exemplary routing groups or situations are utilized, with their corresponding timing delay parameters for providing concurrent alerting: group 1, wireline DNs, which may be located locally, regionally, nationally or internationally; group 2, wireless DNs in a location served by the originating MSC 310; group 3, wireless DNs in a location served by a serving MSC 315; and group 4, wireless DNs served from a location in which its data or other information is located on a different HLR, i.e., on an HLR other than HLR 320.

Continuing to refer to FIG. 3, when an originating MSC 310 receives an incoming call to or otherwise designating a pilot DN or other primary directory number, the originating MSC 310 transmits a query or other message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the pilot or primary DN is for a flexible alerting group or other multi-leg communications group, and if so, prepares a response or other message containing the secondary DNs (of the user's or subscriber's defined alerting group), and further containing their corresponding parameters, such as RSAT values, NAT values, and termination triggers. As mentioned above, based upon call progress and status information, such as time to answer or answering frequency, the listing of secondary DNs and their corresponding parameters may be varied, on a dynamic basis and in real time. The HLR 320 then transmits, back to the originating MSC 310, a response data packet having a listing of secondary DNs with each of their corresponding parameters (RSAT values, NAT values, and termination triggers).

Additional processing is typically required for situations in which wireless secondary DNs are in a geographical location served by a serving MSC 315, such as regions 340 or 350 illustrated in FIG. 3. As mobile units 230 power on, a signal is typically transmitted between the mobile unit 230 and the MSC serving the geographic region in which the mobile unit is located, which may be an originating MSC 310 or a serving MSC 315, which signal indicates that the mobile unit 230 is within that service region. In addition, when an originating MSC 310 receives a call for one of its mobile units 230, it typically transmits a request (or page) to that mobile unit 230 to verify its location prior to allocating its resources (such as a wireless channel) and connecting the wireless call. As these various mobile units 230 travel and roam out of the geographic region 330 served by its originating (or "home") MSC 330, and move into regions 340 or 350 served by other MSCs referred to as the serving MSCs 315, the mobile units 230 and the serving MSCs 315 also exchange such location information. For any given call, the serving MSC 315 assigns each such roaming mobile unit 230 a temporary local directory number ("TLDN") for use within its serving geographic region 340 or 350. The serving MSC 315 also transmits this location information to the HLR 320. The HLR 320 maintains and logs this information as each such mobile unit 230 may roam in and out of the various geographic regions, such as regions 330, 340 and 350, and stores such information by typically updating a memory pointer designating the particular serving MSC 315 corresponding to the secondary DN of the roaming mobile unit 230.

As a consequence, when the HLR 320 receives a query from an originating MSC 310 concerning an alerting group corresponding to a primary DN, such as an ANSI-41 LocationRequest, the HLR 320 may have information indicating that a particular mobile unit 230 of the alerting group is or was last known to be in a region 340 or 350 of a serving MSC 315. The HLR 320 then transmits a routing request to the serving MSC 315 for the particular mobile unit 230 (having the corresponding secondary DN of the alerting group), such as an ANSI-14 RoutingRequest INVOKE, requesting a TLDN to correspond to the particular roaming mobile unit 230. The serving MSC 315 assigns such a TLDN to the particular roaming mobile unit 230, and transmits this TLDN information to the HLR 320, such as in an ANSI-41 RoutingRequest RETURN RESULT data packet. This TLDN information (instead or in lieu of a secondary DN) is then included in the location response data package transmitted by the HLR 320 to the originating MSC 310, as mentioned above, with a corresponding parameters (RSAT, NAT and termination triggers). As the originating MSC 310 processes and routes the outgoing call legs to the secondary DNs of the alerting group with their corresponding timing delays, the originating MSC 310 waits the predetermined period of time designated by the corresponding timing delay parameter (if any), and then processes and routes the outgoing call leg to the particular roaming mobile unit 230 utilizing its TLDN. Such a call may be routed from the originating MSC 310 to the serving MSC 315 through either a direct signaling and trunk connection 335, if it exists, or may be routed through the network 210, such as the PSTN.

The originating MSC 310, utilizing the information contained in the response data packet (the listing of secondary DNs or TLDNs and each of their corresponding parameters), begins the processing and routing of each outgoing call leg to each secondary DN, with: (1) such processing and routing delayed (if at all) according to each secondary DN's respective timing delay parameter; (2) alerted for the duration of its no answer time parameter, unless an outgoing call leg has been previously answered; and (3) released or otherwise treated according to its no answer termination trigger, also unless another outgoing call leg has been previously answered. If and when one of these outgoing call legs is answered, the originating MSC 310 connects the calling party (incoming leg) to that answered outgoing leg, followed by releasing the remaining outgoing legs and ceasing their alerting.

As mentioned above, in accordance with the invention of the fifth related application, during and following any such flexible alerting session, call progress information is generated or otherwise available to a switch, such as an MSC 215 or 310. In the preferred embodiment, the call progress information is generated and transmitted to a corresponding database 220 or HLR 320. The database 220 or HLR 320, in turn, in accordance with the present invention, may utilize the call progress information to, for example, vary the flexible alerting group to include or exclude secondary DNs, or to generate error messages or notations indicative of a routing failure (to allow for re-entry or re-coding of an erroneous secondary DN, also for example). The database 220 or HLR 320 may also vary the parameters utilized in routing the outgoing call legs to the secondary DNs, such as varying the timing delay parameters, no answer time periods, and termination triggers. In the preferred embodiment, the following types of call progress information are generated for subsequent utilization, in real time and on a dynamic basis, for each outgoing call leg (as applicable): (1) time to answer; (2) routing failure reason; (3) no page response; (4) page response; (5) busy reason; (6) no answer reason; and (7) answer reason. In addition, depending upon the desired implementation, information concerning the duration of the answered call (the time period from the answer to the termination) may also be utilized.

In addition, following receipt of such call progress and status information from the originating MSC 310, the HLR 320 (or database 220) may compile and utilize this information in a wide variety of ways. For example, as mentioned above, utilizing information pertaining to an answering call leg (such as time to answer and answer reason, provided on a per call leg basis), the HLR 320 (or database 220) may generate various statistics, such as answering frequency or average time to answer. Utilizing other call progress information, also for example, such as time to answer and busy reasons, the HLR 320 (or database 220) may determine that certain outgoing call legs are only answered when no one else answers within the flexible alerting group, and as mentioned above, may modify the termination pattern accordingly.

For the answering outgoing call leg, the time to answer (i.e., how much time elapsed between commencement of alerting of that outgoing call leg and when it was answered) may provide useful information for a flexible alerting program. Knowledge of which secondary DN answered, and how quickly the call was answered, may be useful for varying the flexible alerting group. For example, an outgoing call leg that was answered very quickly may indicate that the answering party was already engaged with a prior call and answered the outgoing call leg on a call waiting basis, indicating that the answering party should not be included in the flexible alerting for the next incoming call.

A routing failure reason, namely, why a particular outgoing call leg could not be delivered, also provides significant information for the proper implementation of a flexible alerting program, from providing sufficient service to evaluating potential consumer complaints. For example, a service provider may immediately correct a routing failure due to a wrong number, or improper coding of the secondary DN, in contrast to a routing failure due to all trunks having a busy condition.

As mentioned above, prior to the transmission of an outgoing call leg to the mobile units 230, the various mobile units 230 respond (or do not respond) to a page to determine their location within a given serving region, such as within the region of an originating MSC 310 or a serving MSC 315 (roaming). Information pertaining to whether a particular mobile unit 230 responded (or did not respond) to a given page may influence the paging strategy utilized for the particular mobile unit 230, and may be particularly helpful in evaluating a potential situation in which a particular mobile unit 230 is not receiving a sufficient number of flexible alerting calls. The various paging strategies, which may be altered based on the call progress information, for example, may include paging all cells, paging only the last cell in which the mobile unit was located, paging surrounding cells, or paging multiple times. Also for example, certain mobile units may respond immediately to a first page; as a consequence, a no page response to the first page may be a good indicator that the mobile unit is not located within the region, and a potential second page is unnecessary. Similarly, a page response may indicate a successful paging strategy for a particular mobile unit 230, which may be desirable to repeat in the future.

A busy reason for a particular mobile unit may provide information important to the participants in the flexible alerting group. For example, a busy reason may indicate that a particular mobile unit 230 was already engaged with two communication sessions, an initial call followed by a second call answered with call waiting. Such information may be useful for the dynamic variation of the participants (secondary DNs) within the flexible alerting group, or to provide user feedback, such as to indicate a potential need to expand the number of participants in the group to accommodate traffic and increase availability.

An answer reason or a no answer reason may provide similar information. For example, a no answer may occur because the particular mobile unit 230 was already engaged with a communication session, and did not answer on a call waiting alert. Conversely, an answer may occur during a call waiting condition, or may be a simple answer of an initial call (without call waiting). A no answer reason or an answer reason may also provide useful time-of-day patterns; for example, patterns may develop that certain secondary DNs never answer calls from midnight to 6 a.m., indicating that other secondary DNs should be alerted instead. Such information also may be useful for the dynamic variation of the flexible alerting group, or providing the other types of feedback mentioned above.

In the preferred embodiment, such call progress information is transmitted by the switch, such as an MSC 215, to the database 220 (or HLR 320). Upon receipt of this call progress information, the HLR 320 (or database 220) may then automatically adjust or modify various features of the particular flexible alerting program. As mentioned above, in accordance with the present invention, the various secondary DNs participating within the flexible alerting group may be modified dynamically, in real time. In other circumstances, various error messages may be generated, particularly for routing failures, and paging strategies may be modified.

The ANSI-41 specification, however, does not provide for such dynamic variation in termination and alerting patterns. Indeed, the ANSI-41 specification does not provide for transmission of call progress information to an HLR 320 (or database 220, or a service control point (SCP) (not illustrated), for subsequent use in accordance with the present invention. As a consequence, in the preferred embodiment, call progress information is transmitted utilizing a modified, ANSI-41 compatible format, namely, modifying an information directive ("InformationDirective") of an InformationDirective INVOKE operation that is otherwise available within ANSI-41 to carry the call progress information of the present invention.

More specifically, the information directive operation, defined within ANSI-41 at the same parameter level as a location request, has predefined sub-parameters such as a billing identification, a pilot billing identification, group identification, and leg identification. In accordance with the present invention, the call progress information is carried within a modified information directive as new fields or parameters, referred to as TimeToAnswer, RoutingFailureReason, PageResponseReason, NoPageResponseReason, BusyReason, NoAnswerReason, and AnswerReason. Innumerable other formats, fields or parameters transmitting such call progress information may also be utilized without departing from the spirit and scope of the present invention.

Figure 4:
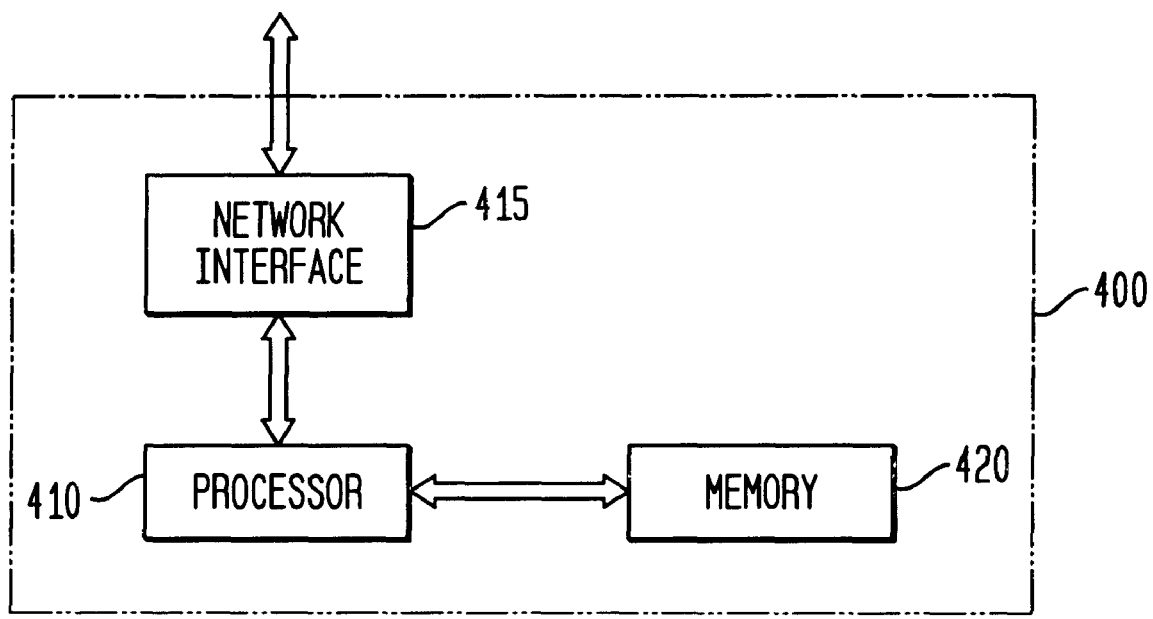
FIG. 4 is a block diagram illustrating an apparatus embodiment in accordance with the present invention.

FIG. 4 is a block diagram illustrating an apparatus embodiment 400 in accordance with the present invention. As discussed in greater detail below, such an apparatus 400 may be included within, or distributed among, an MSC (310 or 315) or HLR 320 of a system 300, or may be included within, or distributed among, a switching center 205 or 215 and database 220 of system 200. The apparatus 400 includes a processor 410, a network interface 415, and a memory 420. The network interface 415 is utilized to receive an incoming call leg to a pilot DN or primary DN, to transmit the plurality of outgoing call legs to the secondary DNs associated with a primary DN, and to transmit and receive the various messages and call progress information discussed above. For example, in system 300, the network interface 415 may be couplable to the network-210 (via a trunk and signaling line) for transmission and reception of PSTN calls, and couplable to an antenna for transmission and reception of wireless calls. The memory 420 may be a magnetic hard drive, an optical storage device, or any other type of data storage apparatus. The memory 420 is used to store information pertaining to primary DNs, such as all associated secondary DNs and their parameters, other call placement and routing information, and/or the call progress information of the present invention. The memory 420 performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 5 and 6, with associated memory, such as microprocessor memory or additional RAM, ROM, EPROM or $E^2$PROM. The methodology of the invention, as discussed above with reference to FIGS. 1–3 and as discussed below with reference to FIGS. 5 and 6, may be programmed and stored, in the processor 410 with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for providing variable termination and alerting patterns for multiple leg telecommunication sessions, based upon call progress and status information, includes, first a network interface 415 for reception of an incoming call leg designating a primary directory number, for transmission of an outgoing call leg, for transmission and reception of call progress information, and for transmission and reception of the various messages discussed above; second, a memory 420 having a plurality of secondary directory numbers associated with the primary directory number, and for each secondary directory number of the plurality of secondary directory numbers, further having a corresponding timing delay parameter, a corresponding no answer time parameter, and a corresponding no answer termination trigger; and third, a processor 410 coupled to the memory and the network interface. The processor, when operative, includes program instructions to differentially process and route each outgoing call leg associated with each secondary directory number, of the plurality of secondary directory numbers, according to its corresponding timing delay parameter, and the processor having further instructions to, unless an outgoing call leg of the plurality of outgoing legs has been answered, alert each outgoing call leg for a time period of its corresponding no answer time parameter and, upon an expiration of the time period, treat each outgoing call leg according to its corresponding no answer termination trigger.

During and following such differential processing and routing, the processor has further instructions to generate and utilize the call progress information. In the preferred embodiment, the processor generates any applicable call progress information, including a time to answer; a routing failure reason, if any; a no page response, if any; a page response, if any; a busy reason, if any; a no answer reason, if any; and an answer reason. In addition, depending upon the desired implementation, the processor may also include instructions to generate information concerning the duration of the answered call (the time period from the answer to the termination). The processor has further instructions to utilize the call progress and status information, such as to vary the termination list of secondary DNs stored in memory 420, and to vary the routing parameters, such as timing delay parameters and no answer time parameters.

Figure 5:
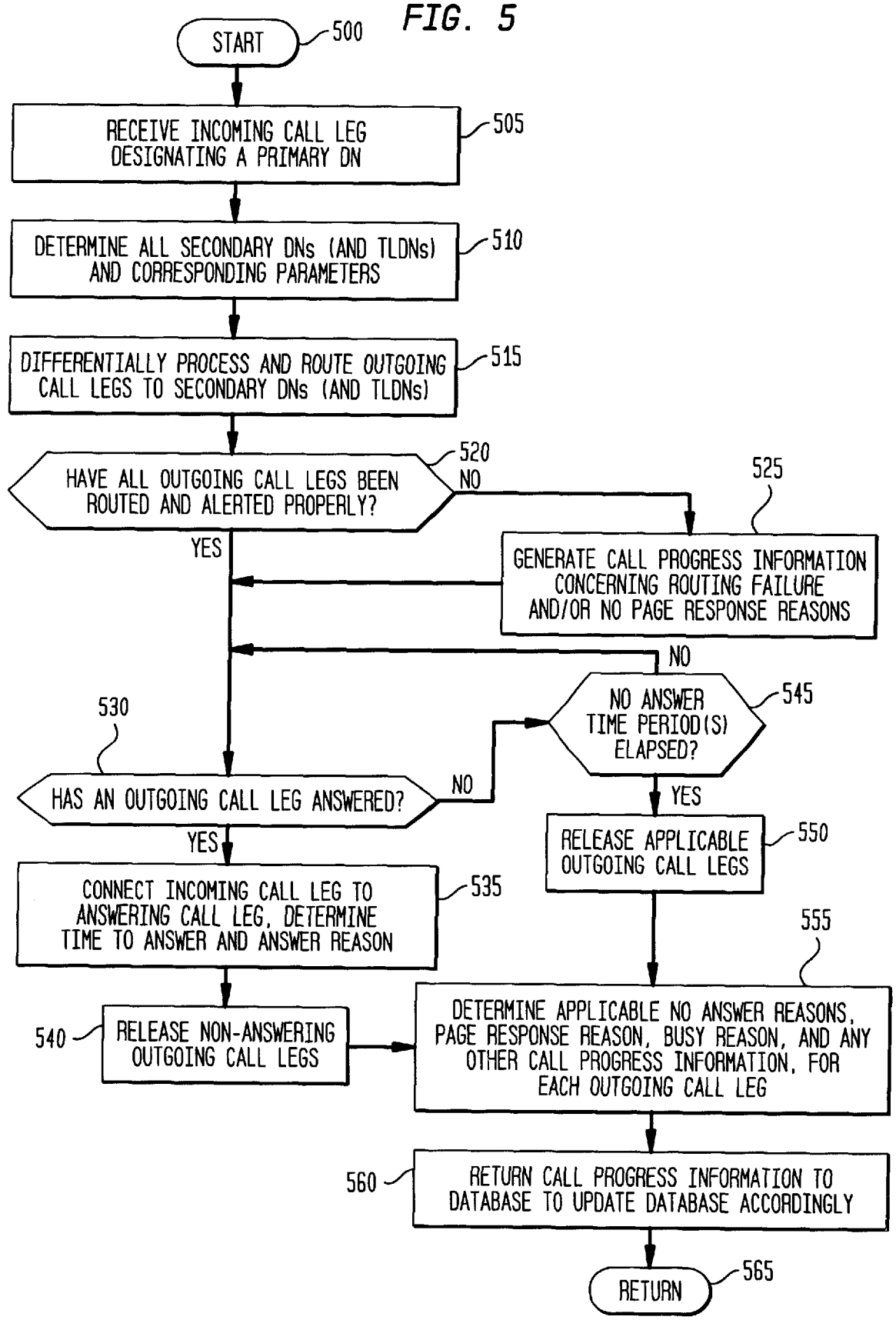
FIG. 5 is a flow diagram illustrating a method to generate call progress and status information utilized in accordance with the present invention.

FIG. 5 is a flow diagram illustrating a method for generating call progress and status information utilized in accordance with the present invention. Referring to FIG. 5, the method begins, start step 500, with reception of an incoming call leg designating a primary directory number, step 505. The method then determines all secondary DNs (and TLDNs, if any), and corresponding parameters, such as timing delay parameters, no answer time parameters, and no answer termination triggers, step 510. The outgoing call legs to the secondary DNs (and TLDNs) are differentially processed and routed, step 515.

Based upon such routing and subsequent events, such as answering, call progress information begins to be generated. Following the processing and routing of step 515, the method determines whether all outgoing call legs have been routed and alerted properly, step 520, for example, determining whether there has been a routing failure or a no page response. When not all outgoing call legs have been routed or alerted properly in step 520, the method generates call progress information, for any such outgoing call leg, concerning such a routing failure and/or no page response, or any other reason for the improper alerting or routing, step 525.

When all outgoing call legs have been properly routed and alerted in step 520, or following step 525, the method determines whether an outgoing call leg has been answered, step 530. When an outgoing call leg has been answered in step 530, the incoming call leg is connected to the answering outgoing call leg, to create a communication session, and the method determines corresponding call progress information, such as the time to answer and the answer reason, step 535. Following step 535, the method then releases the non-answering call legs (or otherwise processes each non-answering outgoing call leg according to its no answer termination trigger).

When an outgoing call leg has not been answered yet (or at all) in step 530, the method determines whether corresponding no answer time periods have elapsed, step 545. When no answer time periods have not elapsed in step 545, the method returns to step 530, to monitor answering of outgoing call legs. When no answer time periods have elapsed in step 545, the corresponding outgoing call legs are released, step 550. Not separately illustrated, this portion of the method (steps 545 and 550) may be accomplished through an iterative (loop) process, on a per leg basis, until one outgoing call leg has been answered or until no answer time periods have elapsed for each outgoing call leg, particularly for the implementation of variable alerting patterns, as disclosed in the fourth related application.

Following steps 540 and 550, the method determines any remaining call progress information, such as any applicable no answer reasons, page response reasons, and busy reasons, for each remaining outgoing call leg, step 555. The method then returns such call progress information to a database (such as database 220 or HLR 320), such as through the information directive discussed above, to update the database accordingly (such as for subsequent varying of the members of the flexible alerting group, as discussed below), step 560. Following step 560, the method may end, return step 565.

FIG. 6 is a flow diagram illustrating a method embodiment to generate variable termination, paging, and alerting patterns in accordance with the present invention. Beginning with start step 600, call progress and status information is received, step 605, typically by the database 220 or HLR 320, as transmitted from a switch (such as an MSC 215 or 310). Next, in step 610, the method determines whether the call progress information indicates a routing problem, such as a routing failure. If a routing problem is indicated in step 610, the method deletes from the alerting group the secondary DN corresponding to the problematic outgoing call leg, step 615. Also in step 615, depending upon subscriber parameters (discussed below), another secondary DN may be added to the alerting group, to maintain the size of the group given the deletion. Following step 615, an error message is generated in step 620, so that the routing problem may be subsequently corrected, for example, to correct an erroneously encoded secondary DN.

Following step 620, or when no routing problems are indicated in step 610, the method determines whether the call progress and status information indicates a variance from subscriber parameters, step 625. As mentioned above, flexible alerting group membership and corresponding parameters (such as timing delay, no answer time, and termination trigger parameters) are specified to accommodate and reach various subscriber goals, such as equal answer frequencies for a repair or dispatch service. Depending upon each individual subscriber's goals, as specified, the call progress and status information fed back from a switch may or may not be meeting these specifications. When the call progress and status information does not indicate a variance from these specifications, then no parameters need to be adjusted, and the method may proceed to step 670 to update records, such as those stored in database 220 or HLR 320. When a variance is indicated in step 625, the method proceeds to step 630, to determine the type of variance and to adjust the corresponding parameters.

In step 630, the method first determines whether the call progress and status information indicates a variance in call answering frequency. If there is a variance from the subscriber's preferred range of answering frequencies for the various secondary DNs of the subscriber's group in step 630, the method adjusts the termination pattern accordingly, such as adding or deleting secondary DNs, as discussed above, step 635. Following step 635, or when there is no significant variance from the specified answering frequencies in step 630, the method proceeds to step 640, and determines whether the call progress and status information indicates a variance from the specified paging responses, such as whether no page responses have been returned. When there is a variance in paging responses in step 640, the method correspondingly adjusts the paging strategy as discussed above, step 645.

Following step 645, or when there is no significant paging response variance in step 640, the method determines whether the call progress and status information indicates a variance from the subscriber's preferred range of routing parameters, step 650, such as a variance from the timing delay, no answer time, or termination trigger parameters. When there is a variance from the routing parameters in step 650, the method adjusts the alerting pattern accordingly, step 655, such as instituting a pyramid alerting pattern, or varying a given pattern. As discussed above with reference to FIG. 1D, for example, outgoing call legs to certain secondary DNs may take longer to be answered and, accordingly, to achieve the goals of the particular alerting group, routing parameters may be adjusted, such as comparatively shortening timing delay parameters (or lengthening others), and increasing no answer time parameters.

Following step 655, or when the call progress and status information does not indicate a routing parameter variance in step 650, the method proceeds to step 660 to determine whether there is a variance with any other parameters. When there is a variance with a remaining parameter in step 660, the parameter is adjusted accordingly, step 665. When there are no further variances in step 660, or following steps 665 or 625, the method updates records to accommodate any changes which have been made and to revise other stored information based on the received call progress and status information, step 670, such as updating the information stored in database 220 or HLR 320. Following such an update, the method may end, return step 675.

Numerous advantages of the present invention may be apparent from the discussion above. First, in accordance with the present invention, an apparatus, method and system are illustrated which provide variable termination and alerting patterns, based upon call progress information, for multiple leg telecommunication sessions. Second, the apparatus, method and system of the present invention provide such variable termination patterns automatically and without user intervention, are user friendly and user transparent. In addition, the variable termination and alerting patterns are provided in real time and on a dynamic basis, to be responsive to changing environmental and user conditions which may arise in wireless or wireline communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for providing variable termination and alerting patterns for multiple leg telecommunication sessions, the method comprising:

(a) receiving call progress and status information for a plurality of outgoing call legs corresponding to a first plurality of secondary directory numbers associated with a primary directory number;

(b) when the call progress and status information indicates a misrouting of an outgoing call leg of the plurality of outgoing call legs, deleting a secondary directory number corresponding to the misrouted outgoing call leg from the first plurality of secondary directory numbers; and (c) when the call progress and status information indicates a variance from subscriber parameters, adjusting a termination and alerting pattern corresponding to the first plurality of secondary directory numbers.

2. The method of claim 1, wherein step (c) further comprises:

when the call progress and status information indicates a variance from a specified answering frequency, deleting at least one secondary directory number from the first plurality of secondary directory numbers to form a second plurality of secondary directory numbers associated with the primary directory number.

3. The method of claim 2, further comprising:

adding at least one different secondary directory number to the second plurality of secondary directory numbers.

4. The method of claim 1, wherein step (c) further comprises:

when the call progress and status information indicates a paging response variance, adjusting a paging strategy associated with the first plurality of secondary directory numbers.

5. The method of claim 1, wherein step (c) further comprises:

when the call progress and status information indicates a routing parameter variance, adjusting a corresponding routing parameter.

6. The method of claim 5, further comprising:

when the call progress and status information indicates a comparatively low answer frequency for a specified outgoing call leg of the first plurality of outgoing call legs, decreasing a timing delay parameter for the specified outgoing call leg.

7. The method of claim 6, further comprising:

increasing a no answer time parameter for the specified outgoing call leg.

8. The method of claim 1, wherein step (b) further comprises:

generating an error message indicating the misrouted outgoing call leg.

9. The method of claim 1, further comprising:

(d) revising stored information pertaining to the first plurality of secondary directory numbers and corresponding routing parameters.

10. The method of claim 1, further comprising:

when the call progress and status information indicates an answering outgoing call leg, deleting a secondary directory number from the first plurality of outgoing call legs corresponding to the answering outgoing call leg, for a next multiple leg telecommunication session.

11. A system for providing variable termination and alerting patterns for multiple leg telecommunication sessions, the system comprising:

a switching center, the switching center for generating and transmitting call progress and status information for a plurality of outgoing call legs corresponding to a first plurality of secondary directory numbers associated with a primary directory number;

a database coupled to the switching center to receive the call progress and status information, the database having stored in a memory the first plurality of secondary directory numbers and corresponding routing parameters, the database including instructions, when the call progress and status information indicates a misrouting of an outgoing call leg of the plurality of outgoing call legs, to delete a secondary directory number corresponding to the misrouted outgoing call leg from the first plurality of secondary directory numbers; and the database including further instructions, when the call progress and status information indicates a variance from subscriber parameters, to adjust a termination and alerting pattern corresponding to the first plurality of secondary directory numbers.

12. The system of claim 11, wherein the database includes further instructions, when the call progress and status information indicates a variance from a specified answering frequency, to delete at least one secondary directory number from the first plurality of secondary directory numbers to form a second plurality of secondary directory numbers associated with the primary directory number.

13. The system of claim 12, wherein the database includes further instructions to add at least one different secondary directory number to the second plurality of secondary directory numbers.

14. The system of claim 11, wherein the database includes further instructions, when the call progress and status information indicates a paging response variance, to adjust a paging strategy associated with the first plurality of secondary directory numbers.

15. The system of claim 11, wherein the database includes further instructions, when the call progress and status information indicates a routing parameter variance, to adjust a corresponding routing parameter.

16. The system of claim 15, wherein the database includes further instructions, when the call progress and status information indicates a comparatively low answer frequency for a specified outgoing call leg of the first plurality of outgoing call legs, to decrease a timing delay parameter for the specified outgoing call leg.

17. The system of claim 16, wherein the database includes further instructions to increase a no answer time parameter for the specified outgoing call leg.

18. The system of claim 11, wherein the database includes further instructions to generate an error message indicating the misrouted outgoing call leg.

19. The system of claim 11, wherein the database includes further instructions to revise stored information pertaining to the first plurality of secondary directory numbers and corresponding routing parameters.

20. The system of claim 11, wherein the database includes further instructions, when the call progress and status information indicates an answering outgoing call leg, to delete a secondary directory number from the first plurality of outgoing call legs corresponding to the answering outgoing call leg, for a next multiple leg telecommunication session.

21. An apparatus for providing variable termination and alerting patterns for multiple leg telecommunication sessions, the apparatus comprising:

a network interface for reception of call progress and status information for a plurality of outgoing call legs corresponding to a first plurality of secondary directory numbers associated with a primary directory number;

a memory storing the first plurality of secondary directory numbers and corresponding routing parameters; and a processor coupled to the memory and the network interface, wherein the processor, when operative, includes instructions, when the call progress and status information indicates a misrouting of an outgoing call leg of the plurality of outgoing call legs, to delete a secondary directory number corresponding to the misrouted outgoing call leg from the first plurality of secondary directory numbers; and the database including further instructions, when the call progress and status information indicates a variance from subscriber parameters, to adjust a termination and alerting pattern corresponding to the first plurality of secondary directory numbers.

22. The apparatus of claim 21, wherein the processor includes further instructions, when the call progress and status information indicates a variance from a specified answering frequency, to delete at least one secondary directory number from the first plurality of secondary directory numbers to form a second plurality of secondary directory numbers associated with the primary directory number.

23. The apparatus of claim 22, wherein the processor includes further instructions to add at least one different secondary directory number to the second plurality of secondary directory numbers.

24. The apparatus of claim 21, wherein the processor includes further instructions, when the call progress and status information indicates a paging response variance, to adjust a paging strategy associated with the first plurality of secondary directory numbers.

25. The apparatus of claim 21, wherein the processor includes further instructions, when the call progress and status information indicates a routing parameter variance, to adjust a corresponding routing parameter.

26. The apparatus of claim 25, wherein the processor includes further instructions, when the call progress and status information indicates a comparatively low answer frequency for a specified outgoing call leg of the first plurality of outgoing call legs, to decrease a timing delay parameter for the specified outgoing call leg.

27. The apparatus of claim 26, wherein the processor includes further instructions to increase a no answer time parameter for the specified outgoing call leg.

28. The apparatus of claim 21, wherein the processor includes further instructions to generate an error message indicating the misrouted outgoing call leg.

29. The apparatus of claim 21, wherein the processor includes further instructions to revise information stored in the memory pertaining to the first plurality of secondary directory numbers and corresponding routing parameters.

30. The apparatus of claim 21, wherein the processor includes further instructions, when the call progress and status information indicates an answering outgoing call leg, to delete a secondary directory number from the first plurality of outgoing call legs corresponding to the answering outgoing call leg, for a next multiple leg telecommunication session.

31. A system for providing variable termination and alerting patterns for outgoing call legs for flexible alerting service, the system comprising:

a mobile switching center, the mobile switching center having an interface for receiving an incoming call leg designating a pilot directory number and for differentially processing and routing a plurality of outgoing call legs corresponding to first plurality of secondary directory numbers associated with the pilot directory number; the switching center having further instructions for determining and transmitting call progress and status information for each outgoing call leg of the plurality of outgoing call legs; and a home location register coupled to the mobile switching center to receive the call progress and status information, the home location register having stored in a memory the first plurality of secondary directory numbers and corresponding routing parameters, the home location register including instructions, when the call progress and status information indicates a misrouting of an outgoing call leg of the plurality of outgoing call legs, to delete a secondary directory number corresponding to the misrouted outgoing call leg from the first plurality of secondary directory numbers; and the home location register including further instructions, when the call progress and status information indicates a variance from subscriber parameters, to adjust a termination and alerting pattern corresponding to the first plurality of secondary directory numbers.

32. The system of claim 31, wherein the home location register includes further instructions, when the call progress and status information indicates a comparatively higher answering frequency for a specified secondary directory number, to delete temporarily the specified secondary directory number from the first plurality of secondary directory numbers to form a second plurality of secondary directory numbers associated with the primary directory number.

33. The system of claim 32, wherein the home location register includes further instructions to add temporarily at least one different secondary directory number to the second plurality of secondary directory numbers.

34. The system of claim 31, wherein the home location register includes further instructions, when the call progress and status information indicates a no page response for a specified directory number, to temporarily delete the specified secondary directory number from the first plurality of secondary directory numbers to form a second plurality of secondary directory numbers associated with the primary directory number.

35. The system of claim 31, wherein the home location register includes further instructions, when the call progress and status information indicates a routing parameter variance, to adjust a corresponding routing parameter to provide a varied alerting pattern.

36. The system of claim 35, wherein the home location register includes further instructions, when the call progress and status information indicates a comparatively lower answer frequency for a specified outgoing call leg of the first plurality of outgoing call legs, to decrease a timing delay parameter for the specified outgoing call leg.

37. The system of claim 36, wherein the home location register includes further instructions to increase a no answer time parameter for the specified outgoing call leg.

38. The system of claim 31, wherein the home location register includes further instructions to generate an error message indicating the misrouted outgoing call leg.

39. The system of claim 31, wherein the home location register includes further instructions to revise stored information pertaining to the first plurality of secondary directory numbers and corresponding routing parameters.

40. The system of claim 31, wherein the home location register includes further instructions, when the call progress and status information indicates an answering outgoing call leg, to delete a secondary directory number from the first plurality of outgoing call legs corresponding to the answering outgoing call leg, for a next multiple leg telecommunication session.

* * * * *